United States Patent [19]
Abe

[11] Patent Number: 5,404,356
[45] Date of Patent: Apr. 4, 1995

[54] MICROCOMPUTER WITH WATCHDOG TIMER AND I/O PORT CONTROL

[75] Inventor: Nobusuke Abe, Hyogo, Japan

[73] Assignee: Mitsubishi Denki Kabushiki Kaisha, Tokyo, Japan

[21] Appl. No.: 748,480

[22] Filed: Aug. 22, 1991

[30] Foreign Application Priority Data

Oct. 23, 1990 [JP] Japan .................................. 2-285347

[51] Int. Cl.[6] ............................................. G06F 11/00
[52] U.S. Cl. ................................... 371/16.3; 371/9.1; 395/575; 395/800
[58] Field of Search ................. 371/16.3, 9.1; 395/800, 395/575

[56] References Cited

U.S. PATENT DOCUMENTS

| | | | |
|---|---|---|---|
| 4,307,447 | 12/1981 | Provanzano et al. | 364/130 |
| 4,314,334 | 2/1982 | Daughton et al. | 395/325 |
| 4,488,303 | 12/1984 | Abramovich | 371/16.3 |
| 4,535,404 | 8/1985 | Shenk | 395/275 |
| 4,610,013 | 9/1986 | Long et al. | 371/9.1 |
| 4,625,308 | 11/1986 | Kim et al. | 370/95.3 |
| 4,879,647 | 11/1989 | Yazawa | 395/375 |
| 5,068,853 | 11/1991 | Soma et al. | 371/16.3 |

OTHER PUBLICATIONS

"Ein Mikrocontroller fur Steuerungswecke," Gunter Michels, *Der Elektroniker*, Jul. 1988, translated inserts only.

*Primary Examiner*—Alyssa H. Bowler
*Assistant Examiner*—John Follansbee
*Attorney, Agent, or Firm*—Townsend and Townsend Khourie and Crew

[57] ABSTRACT

In a semiconductor device such as a one-chip microcomputer having therein a runaway monitor (watch dog timer) there is provided a control unit for directly controlling the state of an input/output port on the basis of an output (overflow signal) of the runaway monitor and for controlling, in response to the detection of the runaway, the input/output port so that only the input of the input/output port becomes effective. This arrangement can separate the semiconductor device from an external system at the real time when the semiconductor device enters into the runaway state.

13 Claims, 5 Drawing Sheets

MICROCOMPUTER WITH WATCHDOG TIMER AND I/O PORT CONTROL

BACKGROUND OF THE INVENTION

1. Field of the Invention

The present invention relates to a semiconductor device including a watch dog timer (runaway monitoring means).

2. Description of the Prior Art

A description will be made hereinbelow in terms of a one-chip microcomputer which is one of such conventional semiconductor devices. FIG. 6 is a block diagram showing a schematic arrangement of the one-chip microcomputer including a conventional watch dog timer. In the illustration, numeral 1 represents the one-chip microcomputer, 2 designates a CPU (central processing unit), and 3 depicts a watch dog timer comprising a preset overflow counter which is arranged so as to generate an overflow signal to the CPU 2 when being not initialized by the CPU 2 for a predetermined time. Further, numeral 4 is an input/output port of the one-chip microcomputer 1 which is coupled through an internal bus (not shown) to the CPU 2, 5 represents a reset signal to be outputted at a predetermined time interval from the CPU 2 to the watch dog timer 3, 6 designates an overflow signal to be outputted from the watch dog timer 3 to the CPU 2, and 7 depicts a control signal whereby the CPU 2 controls the input/output port 4. Still further, numeral 8 is an external system such as an engine controller which is coupled to the input/output port 4 so as to be controlled by the CPU 2 of the one-chip microcomputer 1.

Secondly, a description will be made hereinbelow in terms of the operation. The watch dog timer 3 is for monitoring the runaway of the CPU 2 and arranged so as to generate the overflow signal 6 to the CPU 2 in the case that the CPU 2 encounters difficulty to output the periodic reset signal 5 due to the runaway resulting from the disturbance such as noises so that the CPU 2 does not initialize the watch dog timer irrespective of elapse of a predetermined time period. The CPU 2 receives as a non-maskable interrupt signal the overflow signal 6 therefrom, thereby returning from the runaway. In this case, in order to avoid the adversely influence to the external system 8, the one-chip microcomputer 1 itself can be required to be separated therefrom. Thus, the CPU 2 outputs the control signal 7 to the input/output port 4 in the interrupt process so as to be separated from the external system 8.

There is a problem which arises with such a conventional device, however, in that, for separating the one-chip microcomputer from the external system at the time of the runaway of the CPU, the separation process is arranged to be performed in the CPU interrupt process, and therefore the software overhead essentially occurs so as to make it difficult to separate the CPU from the external system at the real time in response to the occurrence of the runaway.

SUMMARY OF THE INVENTION

It is therefore a principal object of the present invention to provide a semiconductor device which is capable of separating the CPU from the external system at the real time in response to the occurrence of the runaway.

Another object of this invention is to provide a semiconductor device which is capable of flexibly coping with the case that the external system requires a given signal for the danger-protecting purposes at the time of the occurrence of the runaway, for example.

In order to achieve the aforementioned object, a semiconductor device according to this invention is equipped with control means for directly controlling the state of the input/output port on the basis of the output (overflow signal) of the runaway monitoring means (watch dog timer) and determining that only the input of the input/output port is effective when the runaway occurs.

In accordance with this invention, there is further provided a semiconductor device which is equipped with the above-mentioned control means and further equipped with first setting means for setting as to whether the input of the output (overflow signal) of the runaway monitoring means (watch dog timer) to the control means is effective or not and second setting means for setting the output state of the input/output port to the H- or L-level in response to the detection of the runaway.

The control means and the first and second setting means are provided with respect to each of terminals of the input/output port so as to allow the programming with the software and further to allow the mask-option setting with respect to each of the terminals.

Thus, the semiconductor apparatus of this invention is arranged so as to directly control the state of the input/output port on the basis of the runaway detection output (overflow signal) of the runaway monitoring means (watch dog timer) to determine that only the input is effective, thereby allowing the separation of the semiconductor device from the external system at the real time in response to the runaway of the semiconductor device.

Furthermore, the semiconductor apparatus of this invention permits the separation of the semiconductor device from the external system at the real time in accordance with the setting results of the first and second setting means at the time of the runaway of the: semiconductor device, and further permits setting the output state of the input/output port to the H- or L-level to thereby flexibly cope with the case that the external system requires a given signal for preventing danger or other at the time of the occurrence of the runaway. In addition, the flexibility is further improved by using the software programming, and a latch and others can be omitted with the mask option so as to permit the size-reduction and cost-reduction.

The above and other objects, features, and advantages of the Invention will become more apparent from the following description when taken in conjunction with the accompanying drawings.

DESCRIPTION OF THE REFERRED EMBODIMENT

The embodiments of the present invention which is applied to a one-chip microcomputer will be described hereinbelow.

Figure 1:
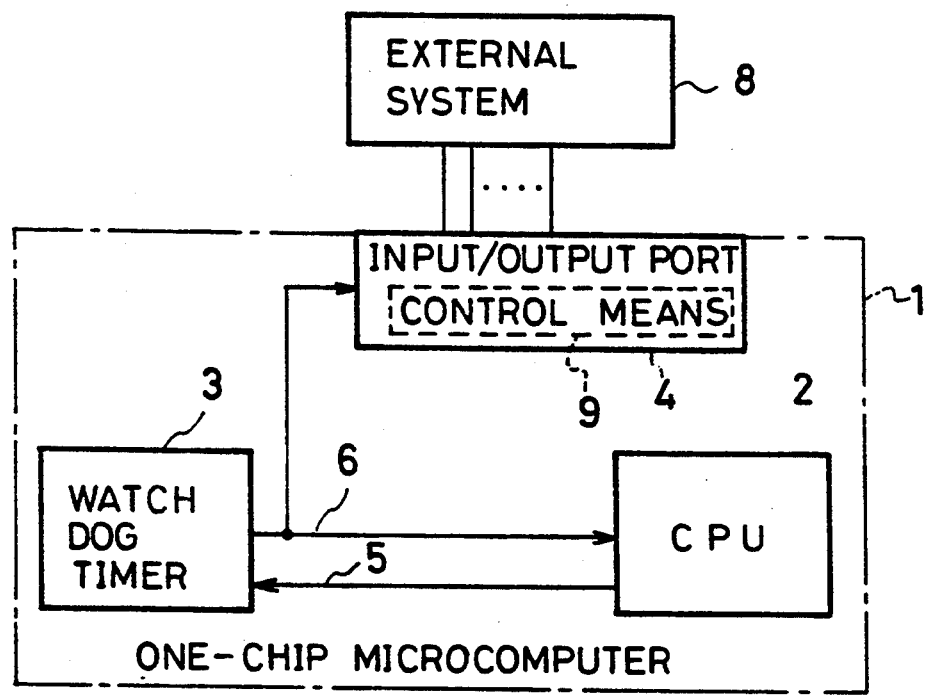
FIG. 1 is a block diagram showing a schematic arrangement of an embodiment of the present invention.

In FIG. 1, numeral 1 represents a one-chip microcomputer, 2 designates a CPU, and 3 depicts a watch dog timer which is arranged so as to generate an overflow signal to the CPU 2 when the initialization of a counter is not made by the CPU 2 irrespective of a predetermined time period elapsing. Further, numeral 4 denotes an input/output port of the one-chip microcomputer 1 which is coupled through an internal bus (not shown) to the CPU 2, 5 indicates a reset signal to be outputted from the CPU 2 to the watch dog timer 3 at a predetermined time interval, 6 is an overflow signal to be outputted from the watch dog timer 3 to the CPU 2 and the input/output port 4, and 8 is an external system coupled to the input/output port 4 so as to be controlled by means of the CPU 2 of the one-chip microcomputer 1. Here, newly included in the input/output port 4 of the one-chip microcomputer 1 is a control means 9 for controlling the state of the input/output port 4 on the basis of the overflow signal 6 from the watch dog timer 3 so that only the input becomes effective.

Figure 2:
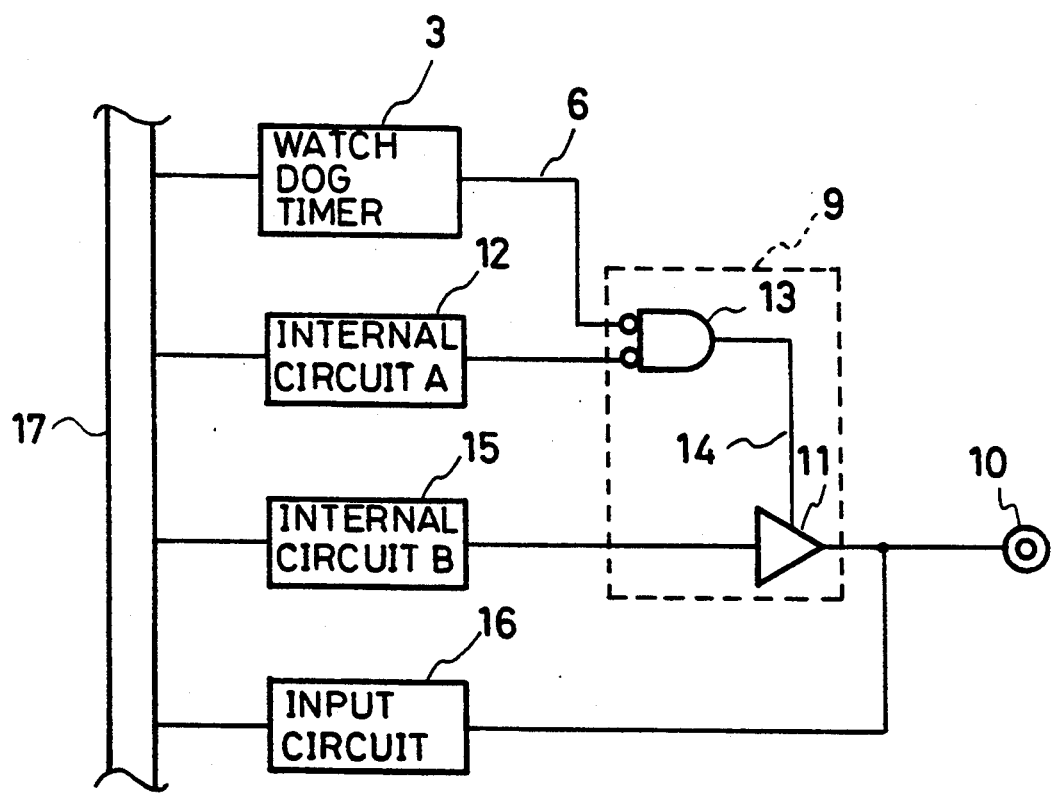
FIG. 2 schematically shows an arrangement of a principal portion of a first embodiment.

FIG. 2 shows the detailed arrangement of the principal portion of the above-described embodiment. Here, although the input/output port 4 is equipped with a number of input and output terminals, the description will be made only in terms of one input and output terminal for simplification because of having the same structure. In the illustration, numeral 3 represents the watch dog timer and 6 designates the overflow signal of the watch dog timer 3 which takes "H" in the active state and takes "L" in the normal state, Numeral 10 is an input/output terminal, 11 represents a tri-state buffer provided in order to control the output of the input/output terminal 10, and 12 designates an internal circuit A for controlling the ON and OFF of the tri-state buffer 11 when the watch dog timer is not in the overflow state, that is, when the CPU 2 in FIG. 1 is not in the runaway state. Further, numeral 13 depicts a NOR circuit for inputting the overflow signal 6 of the watch dog timer 3 and the output of the internal circuit A (12), the output of the NOR circuit 13 is used as a control signal 14 for the tri-state buffer 11, and when it is in the H-level, the tri-state buffer 11 turns ON. Numeral 15 represents an internal circuit B for outputting a signal through the tri-state buffer 11 to the input/output terminal 10, 16 denotes an input circuit for inputting the signal from the input/output terminal 10, and 17 indicates an internal bus of the one-chip microcomputer 1. The control means 9 is constituted by tri-state buffer 11 and the NOR circuit 13.

Secondly, the operation of the above-described embodiment will be described hereinbelow. In FIG. 1, as well as the conventional device, the watch dog timer 3 is used for the purpose of monitoring the runaway of the CPU 2, that is, the periodic reset signal 5 cannot be outputted therefrom in the case of the occurrence of the runaway of the CPU 2 due to the disturbance such as noises. If the watch dog timer 3 is not initialized irrespective of the elapse of more-than a predetermined time period, the watch dog timer 3 generates the overflow signal 6 to the CPU 2. The CPU 2 receives as the non-maskable interrupt signal the overflow signal therefrom, thereby releasing from the runaway state. At this time, in order to avoid an adversely influence to the external system 8, the input/output port 4 directly receives the overflow signal 6 from the watch dog timer 3, and the control means 9 sets all the terminals of the input/output port 4 to the input terminals so as to separate the one-chip microcomputer 1 from the external system at the real time. The aforementioned arrangement will be described in detail with reference to FIG. 2. Since the overflow signal 6 becomes in the H-state when the watch dog timer 3 overflows, the control signal 14 of the tri-state buffer 11 which is the output of the NOR circuit 13 enters into the L-state irrespective of the output state of the internal circuit A (12 ), whereby the tri-state buffer turns OFF so that in the input/output terminal 10 only the input compulsorily becomes effective.

Figure 3:
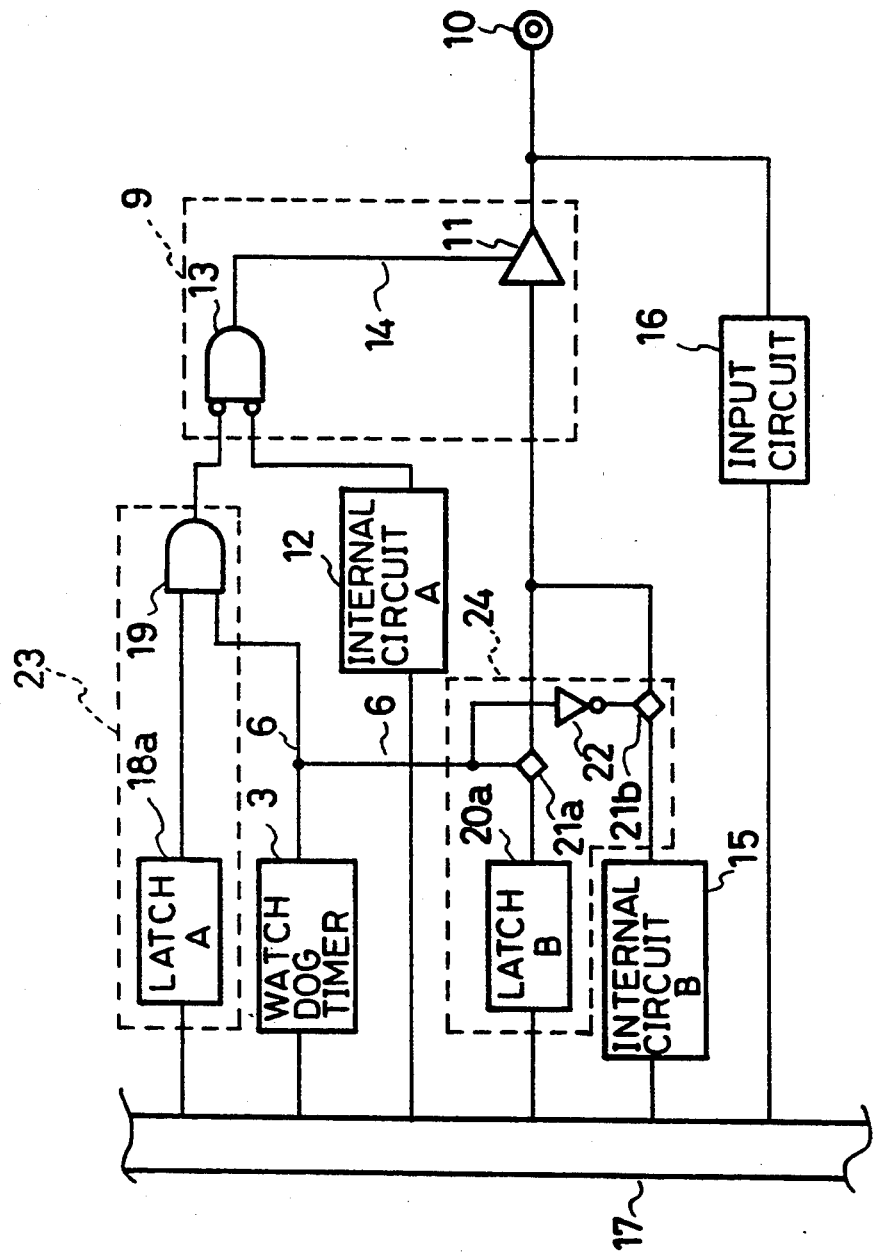
FIG. 3 schematically illustrates an arrangement of a principal portion of a second embodiment.

FIG. 3 shows the detailed arrangement of a principal portion of a second embodiment where only one input/output terminal is illustrated as well as the aforementioned first embodiment (FIG. 2) and parts corresponding to those in FIG. 2 are marked with the same signs and numerals and the description thereof will be omitted for brevity. In the illustration, 18a represents a latch A for setting whether or not the: input of the overflow signal 6 of the watch dog timer 3 to the NOR circuit 13 is effective, and 19 designates an AND circuit for controlling the determination as to whether or not the input of the overflow signal 6 to the NOR circuit 13 is effective in accordance with the contents in which the aforementioned latch A (18a) keeps, the overflow signal 6 of the watch dog timer 3 being coupled through the AND circuit 19 to the NOR circuit 13 so that it becomes effective when the content of the latch A (18a) is "H" and it is masked when the content thereof is "L". Further, reference 20a depicts a latch B for setting to "H" or "L" the level to be outputted from the input/output terminal 10 when the watch dog timer 3 overflows, 21a and 21b are gates each of which takes the ON state when the control signal is "H" and takes the OFF state when the control signal is "L", the overflow signal 6 of the watch dog timer 6 being directly supplied as the control signal to the gate 21a provided between the latch B (20a) and the tri-state buffer 11 and the overflow signal 6 being supplied as the control signal through an inverter 22 to the gate 21b provided between the internal circuit B (15) and the tri-state buffer 11. The two gates 21a and 21b are arranged such that only either of them takes the ON state. Here, the control means 9 is made up by the tri-state buffer 11 and the NOR circuit 13, a first setting means 23 is made up by the latch A (18a) and the AND circuit 19, and a second setting means 24 is made up with the latch B (20a), the gates 21a, 21b and the inventor 22. In this embodiment, since the first and second setting means 23 and 24 are respectively realized with the latch A (18a) and the Latch B (20a) which are coupled to the internal bus 17, each terminal becomes software-programmable.

It is obvious that this embodiment executes the same operation as the above-described first embodiment (FIG. 2) when the value of the latch A (18a) is "H". When the latch A (18a) takes "L", the overflow signal 6 of the watch dog timer 3 is masked by the AND circuit 19 and the tri-state buffer 11 is controlled by the internal circuit. A (12). In the case that the value of the internal circuit A (12) is "L" and the tri-state buffer 11 is in the ON state, since the overflow signal 6 is "L" when the watch dog timer 3 does not overflow, the value of the internal circuit B (15) is outputted to the terminal 10 by means of the inventor 22, and since the overflow signal 6 is "H" when the watch dog timer 3 overflows, the value ("H" or "L") set in the latch B (20a) is outputted to the terminal 10. Thus, as well as the above-described embodiment, all the terminals of the input/output port 4 are set to the input terminals by means of the control means 9, whereby the one-chip microcomputer 1 can be separated from the external system 8 at the real time, the watch dog timer 3 can output the overflow signal 6 with "H" or "L" level in the case that for preventing the danger or other at the time of the runaway of the CPU 2 the external system 8 requires a given default signal from the one-chip microcomputer 1, and in addition, the software-programmable setting of these operations can be effected at every terminal so as to provide an extreme flexibility.

Figure 4:
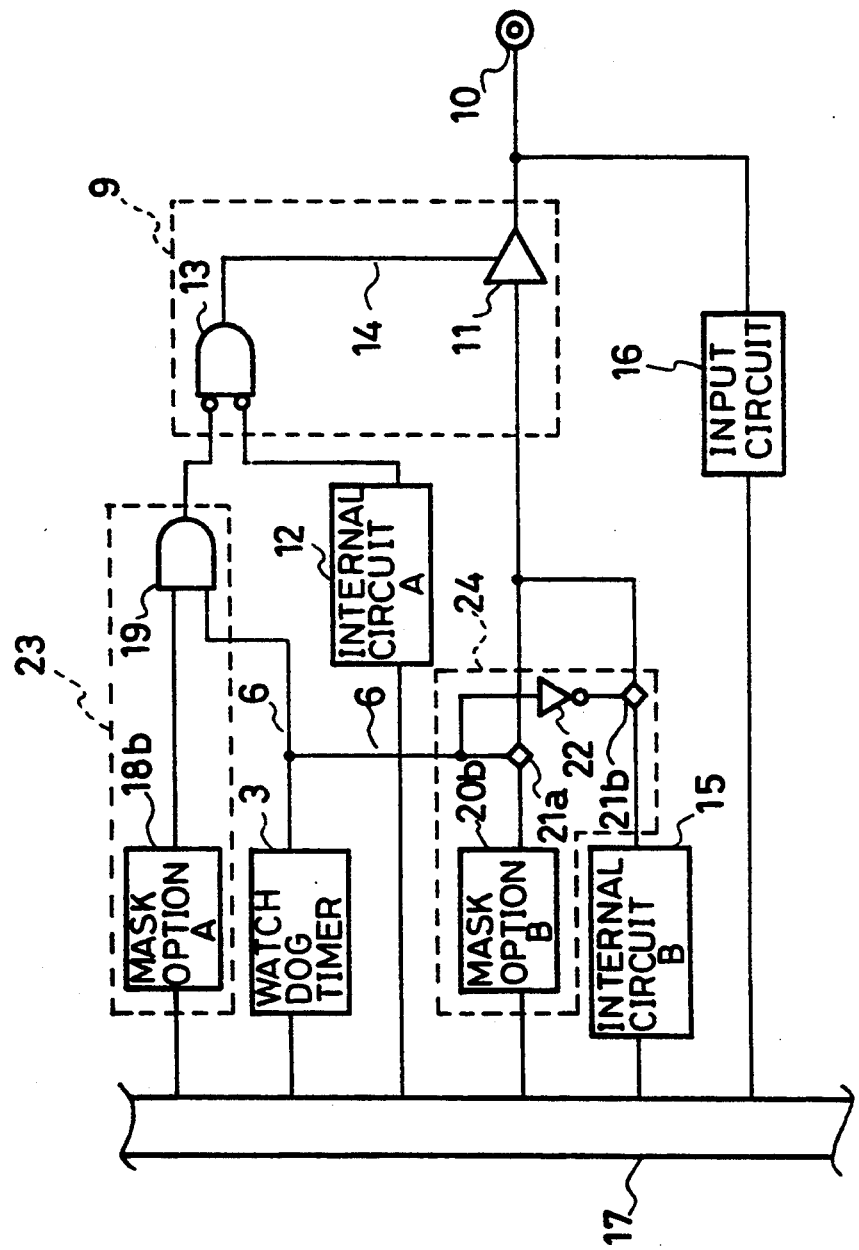
FIG. 4 is a schematical illustration of an arrangement of a principal portion of a third embodiment.
Figure 5:
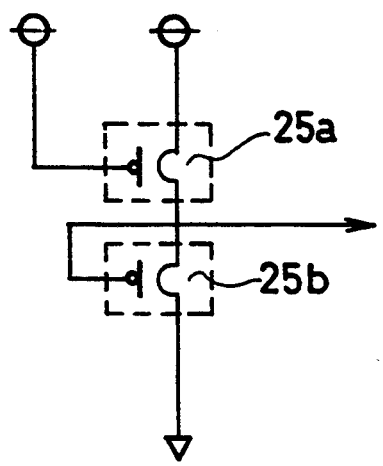
FIG. 5 is an illustration for describing the mask option in the third embodiment.
Figure 6:
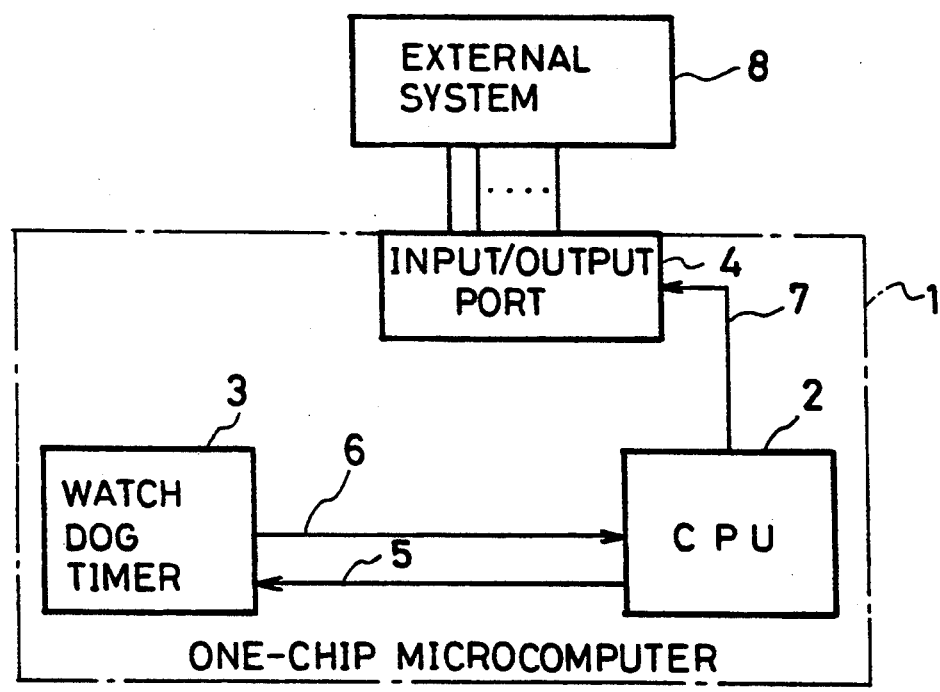
FIG. 6 is a block diagram showing a schematic arrangement of a conventional device.

FIG. 4 illustrates the detailed arrangement of a principal portion of a third embodiment. The difference from the above-described second embodiment (FIG. 3) is that the latches A and B (18a, 20a) making up the first and second setting means 23 and 24 are replaced with mask options A and B (18b and 20b) each of which can set the normal "H" or "L" by the mask option. Although in the second embodiment the programming setting of the state can be effected by the software, in this embodiment it is fixed by the hardware (the basic operations are the same). However, as shown in FIG. 5, in the mask options A and B (18b and 20b), the boron is given to either of two PMOSs (25a and 25b), surrounded by a dotted line so that the PMOS turns ON so as to perform the output setting of "H" or "L. As compared with the latches A and B (18a and 20a), this arrangement can reduce the hardware amount to permit size-reduction and cost-reduction.

Here, although the above-described embodiments relate to one-chip microcomputer having therein a watch dog timer, this invention is applicable to a device in which the microcomputer and the watch dog timer are independently placed on different chips. This can offer the same effect as the above-described embodiments.

As described above, according to this invention, in the semiconductor device having therein the runaway monitoring means (watch dog timer) there is provided the control means for directly controlling the state of the input/output port on the basis of the output (overflow signal) of the runaway monitoring means (watch dog timer) and performing so that only the input of the input/output port becomes effective in response to the detection of the runaway, and therefore, the semiconductor device can be separated from the external system at the real time when the semiconductor device enters into the runaway state.

In addition, in the case the semiconductor device is arranged to be equipped with the first and second setting means, not only the semiconductor device can be separated from the external system at the real time as described above, but also the output state of the input/output port can be set to the "H" or "L" level, thereby allowing a flexible treatment in the case that the external system requires a given signal at the time of the runaway for the danger preventing purposes. Moreover, in the case of permitting the programming setting for each terminal, the flexibility can further be improved. Furthermore, in the case of providing the mask option, the latch and others can be omitted so as to allow the size-reduction and cost-reduction.

What is claimed is:

1. A semiconductor device comprising:
a processing unit;
runaway monitoring means, coupled to said processing unit, for monitoring runaway of said processing unit and for producing a runaway detection signal indicating detection of runaway;
an input/output port;
input/output control means, receiving as input said runaway detection signal and coupled to said input-/output port, for directly enabling output from said semiconductor device via said input/output port when said runaway detection signal indicates that runaway has been detected; and
setting means, receiving as input said runaway detection signal and coupled to said input/output control means, for controlling whether said runaway detection signal propagates to said input/output control means, wherein said setting means comprises:
a circuit for producing a propagation control signal indicating whether said runaway detection signal is to propagate to said input/output means; and
an AND gate responsive to said propagation control signal and to said runaway detection signal, the output of said AND gate being the output of said setting means; wherein said semiconductor comprises a circuit for producing an output signal for, output via said input/output port; and
said input/output control means comprises:
a circuit for producing a buffer control signal for controlling the ON/OFF state of a tri-state buffer;
a NOR gate responsive to said setting means and to said buffer control signal; and
said tri-state buffer whose ON/OFF state is controlled by the output of said NOR gate and whose input is said output signal and whose output is tied to said input/output port.

2. The semiconductor device of claim 1, wherein said setting means is programmable by software.

3. The semiconductor device of claims 1 wherein said setting means is a mask option.

4. A semiconductor device comprising:
a processing unit;
runaway monitoring means, coupled to said processing unit, for monitoring runaway of said processing unit and for producing a runaway detection signal indicating detection of runaway;
an input/output port;
a circuit for producing an output signal for output via said input/output port; and
setting means, receiving as input said runaway detection signal and coupled to said input/output port, for setting to "H" or "L" level the output state of said input/output port when said runaway detection signal indicates that runaway has been detected, wherein said setting means comprises:
a circuit for indicating by signal whether the output state of said input/output port is to be "H" or"L";
a first gate gating said signal from said circuit and responsive to said runaway detection signal;
an inverter responsive to said runaway detection signal; and
a second gate gating said output signal and responsive to the output of said inverter;
wherein only one of said first and second gates is ON at any time.

5. The semiconductor device of claim 4, wherein said setting means is programmable by software.

6. The semiconductor device of claim 4, wherein said setting means is a mask option.

7. A semiconductor device comprising:
   a processing unit;
   runaway monitoring means, coupled to said processing unit, for monitoring runaway of said processing unit and for producing a runaway detection signal indicating detection of runaway;
   an input/output port;
   input/output control means, receiving as input said runaway detection signal and coupled to said input/output port, for directly enabling output from said semiconductor device via said input/output port when said runaway detection signal indicates that runaway has been detected;
   first setting means, receiving as input said runaway detection signal and coupled to said input/output control means, for controlling whether said runaway detection signal propagates to said input/output control means; and
   second setting means, receiving as input said runaway detection signal and coupled to said input/output control means, for setting to a "H" or "L" level the output state of said input/output port when said runaway detection signal indicates that runaway has been detected,
   wherein said first setting means comprises:
     a circuit for producing a propagation control signal indicating whether said runaway detection signal is to affect the ON/OFF state of a tri-state buffer; and
     an AND gate responsive to said propagation control signal and said runaway detection signal, the output of said AND gate being the output of said first setting means.

8. A semiconductor device comprising:
   a processing unit;
   runaway monitoring means, coupled to said processing unit, for monitoring runaway of said processing unit and for producing a runaway detection signal indicating detection of runaway;
   an input/output port;
   a circuit for producing an output signal for output via said input/output port;
   input/output control means, receiving as input said runaway detection signal and coupled to said input/output port, for directly enabling output from said semiconductor device via said input/output port when said runaway detection signal indicates that runaway has been detected;
   first setting means, receiving as input said runaway detection signal and coupled to said input/output control means, for controlling whether said runaway detection signal propagates to said input/output control means; and
   second setting means, receiving as input said runaway detection signal and coupled to said input/output control means, for setting to a "H" or "L" level the output state of said input/output port when said runaway detection signal indicates that runaway has been detected,
   wherein said second setting means comprises:
     a circuit for indicating by signal whether the output state of said input/output port is to be "H" or "L";
     a first gate gating said signal and responsive to said runaway detection signal;
     an inverter responsive to said runaway detection signal; and a second gate gating said output signal and responsive to the output of said inverter;
     wherein only one of said first gate and said second gate is ON at any time.

9. A semiconductor device comprising:
   a processing unit;
   runaway monitoring means, coupled to said processing unit, for monitoring runaway of said processing unit and for producing a runaway detection signal indicating detection of runaway;
   an input/output port;
   input/output control means, receiving as input said runaway detection signal and coupled to said input/output port, for directly enabling output from said semiconductor device via said input/output port when said runaway detection signal indicates that runaway has been detected;
   first setting means, receiving as input said runaway detection signal and coupled to said input/output control means, for controlling whether said runaway detection signal propagates to said input/output control means; and
   second setting means, receiving as input said runaway detection signal and coupled to said input/output control means, for setting to a "H" or "L" level the output state of said input/output port when said runaway detection signal indicates that runaway has been detected;
   wherein:
     said semiconductor further comprises a circuit for producing an output signal for output via said input/output port;
     said input/output control means comprises:
       a circuit for producing a buffer control signal for controlling the ON/OFF state of a tri-state buffer;
       a NOR gate responsive to said first setting means and to said buffer control signal; and
       a tri-state buffer whose ON/OFF state is controlled by the output of said NOR gate and whose input is said output signal and whose output is tied to said input/output port;
     said first setting means comprises:
       a circuit for producing a propagation control signal indicating whether said runaway detection signal is to affect the ON/OFF state of a tri-state buffer; and
       an AND gate responsive to said propagation control signal and said runaway detection signal, the output of said AND gate being the output of said first setting means; and
     said second setting means comprises:
       a circuit for indicating by signal whether the output state of said input/output port is to be "H" or "L";
       a first gate gating said signal and responsive to said runaway detection signal;
       an inverter responsive to said runaway detection signal; and
       a second gate gating said output signal and responsive to the output of said inverter;
       wherein only one of said first gate and said second gate is ON at any time.

10. The semiconductor device of claims 7, 8 or 9 wherein said second setting means is programmable by software.

11. A semiconductor device comprising:

a processing unit;

runaway monitoring means, coupled to said processing unit, for monitoring runaway of said processing unit and for producing a runaway detection signal indicating detection of runaway;

an input/output port;

input/output control means, receiving as input said runaway detection signal and coupled to said input/output port, for directly enabling output from said semiconductor device via said input/output port when said runaway detection signal indicates that runaway has been detected; and setting means, receiving as input said runaway control signal and coupled to said input/output control means, for setting to "H" or "L" level the output state of said input/output port in response to runaway, wherein said setting; means comprises:

a first circuit for indicating by signal whether the output state of said input/output port is to be "H" or "L";

a first gate gating said signal from said first circuit and responsive to said runaway detection signal;

an inverter responsive to said runaway detection signal; and a second gate gating said output signal and responsive to the output of said inverter;

wherein only one of said first and second gates is ON at any time;

wherein said semiconductor further comprises:

a second circuit for producing an output signal for output via said input/output port: and said input/output control means comprises:

a third circuit for producing a buffer control signal for controlling the ON/OFF state of a tri-state buffer;

a NOR gate responsive to said runaway detection signal and to said buffer control signal and said tri-state buffer whose ON/OFF state is controlled by the output of said NOR gate and whose input is said output signal and whose output is tied to said input/output port.

12. The semiconductor device of claim 11, wherein said setting means is programmable by software.

13. The semiconductor device of claim 11, wherein said setting means is a mask option.

* * * * *